United States Patent [19]

Dufresne et al.

[11] Patent Number: 5,373,315
[45] Date of Patent: Dec. 13, 1994

[54] TELEVISION AUDIENCE DATA GATHERING

[75] Inventors: Michel Dufresne, Boucherville; Pierre Garneau, Montreal; Maurice Milot, Anjou; Jean-Paul Brassard, St-Lambert, all of Canada

[73] Assignee: Le Groupe Videotron LTEE, Quebec, Canada

[21] Appl. No.: 213,825

[22] Filed: Mar. 14, 1994

Related U.S. Application Data

[63] Continuation of Ser. No. 735,884, Jul. 25, 1991, abandoned.

[30] Foreign Application Priority Data

Apr. 25, 1991 [CA] Canada ................. 2041210

[51] Int. Cl.$^5$ ............................................. H04H 9/00
[52] U.S. Cl. ............................................. 348/2; 455/2
[58] Field of Search ................. 455/2, 6.1, 6.2; 348/1, 348/2, 5

[56] References Cited

U.S. PATENT DOCUMENTS 4,816,904  3/1989  McKenna et al. ................. 358/84

Primary Examiner—Reinhard J. Eisenzopf
Assistant Examiner—Chi H. Pham
Attorney, Agent, or Firm—Antonelli, Terry, Stout & Kraus

[57] ABSTRACT

A method and apparatus of collecting data from a television audience comprising storing in a first memory demographic descriptions of expected viewers of a television receiver, receiving signals from a viewer control operated by a viewer, displaying one or more indicia on a television screen for viewing by the viewer, designated by the character of the signals received from the control, in confirmation of the particular signal received from the control, and storing a signal in a second memory for later access corresponding to at least one form of the designated signal character, which is related to the designation of at least one selected expected viewer as an active viewer. The television viewer may use his remote control at any time, when the flashing prompt is flashing, or when it is not flashing, to change channels. There is no channel lock nor is there an annoying on-screen prompt enquiring as to the identity of persons in the viewing audience.

28 Claims, 5 Drawing Sheets

TELEVISION AUDIENCE DATA GATHERING

This application is a continuation application of Ser. No. 07/735,884, filed Jul. 25, 1991, now abandoned.

This invention relates to the field of television audience data gathering, and in particular to a method and apparatus for interacting with the television viewer whereby the data can be gathered.

Advertisers and television program schedulers have long sought means for determining the demographics and the numbers of television viewers, in order to be able to schedule programs and commercials most efficiently. The earliest systems to gather this information consisted of apparatus which indicated which channels were being watched. Such systems could be polled from the head end of a cable television (CATV) system, or data could be recorded on hard copy and then physically gathered from time to time. Such systems eventually evolved so that the data was recorded electronically, and was transmitted to a head end at certain intervals either via a CATV system or via a telephone line actuated either at the subscriber's location or from a central polling terminal.

While such systems gathered data as to what channel was being viewed, it did not record the demographics of the viewer or in some cases, the interval of viewing particular channels. However in U.S. Pat. No. 4,107,735 issued Aug. 15th, 1978, assigned to R. D. Percy & Co., a system is described in which questions can be displayed on a screen, and particular members of a viewing family respond, if they are viewing, by pushing buttons on a remote control. The pushed buttons both indicate a response to the questions and identify the presence and thus the identity of the particular responding viewers. The responses are either recorded locally, or could be transmitted to a central location either at the time the questions are displayed, or at some later time.

One of the problems associated with gathering the demographics of the viewing audience involves how to stimulate the viewers to respond and to provide the demographic information. In some systems, such as described in U.S. Pat. No. 2,924,496 issued Feb. 9th, 1960, assigned to A. C. Nielsen Company, a signal light on an apparatus, usually located on top of the television set, is caused to blink, stimulating the viewers. The viewers then push buttons on a remote control apparatus, which indicate the presence of the particular viewers. The channel which is being watched is automatically recorded in association with the designations of the particular viewers.

In another system, described in Canadian Patent 1,241,736, issued Sep. 6th, 1988, assigned to PEAC Media Research Inc., instead of a light a visual prompt is periodically overlaid on normal programming on the television broadcast receiver, enquiring as to the identity of persons in the audience viewing the broadcast receiver. A viewer depresses one or more buttons on a remote control, and the resulting signal is received at a control apparatus (usually disposed on top of the television receiver) which records the signal, which is indicative of the identity of persons in the audience. Periodically telephone communication is established between a memory in which those identities and the channel watched are recorded, to transfer the data to the central location, whereby the demographic information and channel viewed are gathered.

The system described in the aforenoted Canadian patent has certain characteristics which have been determined to cause user annoyance, problems with use and resulting rejection by prospective users. Firstly, once the on-screen prompt automatically appears on the screen overlaid over normal programming, the only way to stop it is to switch the remote control apparatus into a "channel lock" mode. This inhibits the ability of a viewer of the television set to switch channels. This channel lock mode is necessary in order that depressing buttons on the remote control once the on-screen prompt is present should be designative of the identity of persons in the audience, rather than designative of a channel change. Thus once the on-screen prompt is present, either the disturbing prompt must be tolerated, or normal operation of the television set is inhibited. This is clearly a major annoyance to viewers, causing them to reject acceptance of the data gathering apparatus in their homes, since it automatically removes their ability to freely view and control their television sets.

Channel lock is also described in U.S. Pat. No. 3,987,397 issued Oct. 19th, 1976, invented by Brian E. Belcher et al.

A second significant objection to the above system involves the use of on-screen prompts overlaid over normal programming. In order to satisfy the requirements of the audience data gathering company, the prompt appears upon television set turn on and then periodically, e.g. every ten, fifteen or thirty minutes. The on-screen prompt overlaid on normal programming on the television broadcast receiver inquiring as to identity of persons in the audience can be a major source of annoyance to the viewer, particularly if it appears during a critical action scene, or the climax of a show. It can also create substantial annoyance if it occurs during a scene from which the viewer would like to switch channels. Not only does the overlay disturb the program, totally out of control of the viewer, but it forces him to channel-lock the television receiver, forbidding him from changing channels, in order to remove the on-screen overlayed prompt. The viewer is then placed in a figurative straight-jacket by the system.

The present invention, on the other hand, avoids the above problems, allowing the viewer to have utmost flexibility, yet facilitates data gathering in a detailed and sophisticated manner.

In accordance with the present invention, an off-screen viewer prompt, such as a blinking light, is flashed at periodic, aperiodic intervals or under certain conditions on a control unit, typically placed on top of the television set (although it could be built into the television set, if desired). The television viewer may use his remote control at any time, when the flashing prompt is flashing, or when it is not flashing, to change channels. There is no channel lock nor is there an annoying on-screen prompt enquiring as to the identity of persons in the viewing audience.

However, if the viewer wishes to respond to the prompt, he keys in the relevant information such as an identification (ID) demographic indicator, on his remote keypad. The system responds to his purposeful initiation by placing a confirmation display on the television screen. The ID information is recorded in a memory on keying it into the remote control. The confirmation display times out after a short interval, such as three seconds, or may be purposefully cancelled by a "cancel" button on the remote control. At no time is the television set placed in a channel-lock condition. The viewer may change channels at any time, even while the confirmation display is on the screen.

If the on-screen confirmation is in error, after the confirmation display is removed from the screen the viewer can then enter new ID data. For example if the viewer mistakenly entered numeral 3 on his remote control, designating a particular male child as being a viewer, and this is an error, the viewer can then simply enter a numeric code on his remote control designating that the child is not a viewer, and then enter the number designating the correct child, e.g. a particular female child. Software at the head end can note that the male child was indicated as viewing the television set for a trivial period of time, and can reject the entry in a final report.

In this manner, the viewer has complete control over the television set and ID control. Channel switching is never locked out, and there is never an overlay over normal programming, or in substitution for normal programming which is not purposely placed there by the viewer. Yet the use of screen overlays as confirmations allows sophisticated demographic data gathering, as will be noted in an example below.

Indeed, the viewer can enter the identifications of persons who are viewing, that are already demographically defined, at any time, even in the absence of a prompt.

An embodiment of the invention is a method of collecting data from a television set viewer comprising storing in a first memory demographic descriptions of expected viewers of a television receiver, receiving signals from a viewer control operated by a viewer, displaying one or more indicia on a television screen for viewing by the viewer designated by the character of the signals received from the viewer control in confirmation of the particular signal received from the viewer control, storing a signal in a second memory for later access corresponding to at least one form of the designated signal character which is related to the designation of at lest one selected expected viewer as an active viewer.

The response to the viewer identification prompt by the remote control can be designative of a new television channel. In that case the new television channel can be displayed on the screen, and at the same time the television channel can be changed at any time.

The confirmation signal can be a new channel designating number or it can be a signal designating the presence or departure of a particular viewer, or other demographic data, and the system responds accordingly either causing a channel to be changed, or demographic data to be stored. The user need only push two buttons on the remote control and a confirmation button designating the meaning of the initial two (or fewer if desired) buttons.

The remote control contains a response designation key, which indicates whether the remote control numbers keyed by the viewer designate a channel change, or an ID response or demographic or other definition.

A better understanding of the invention will be obtained by reference to the detailed description below, with reference to the following drawings, in which.

Figure 1:
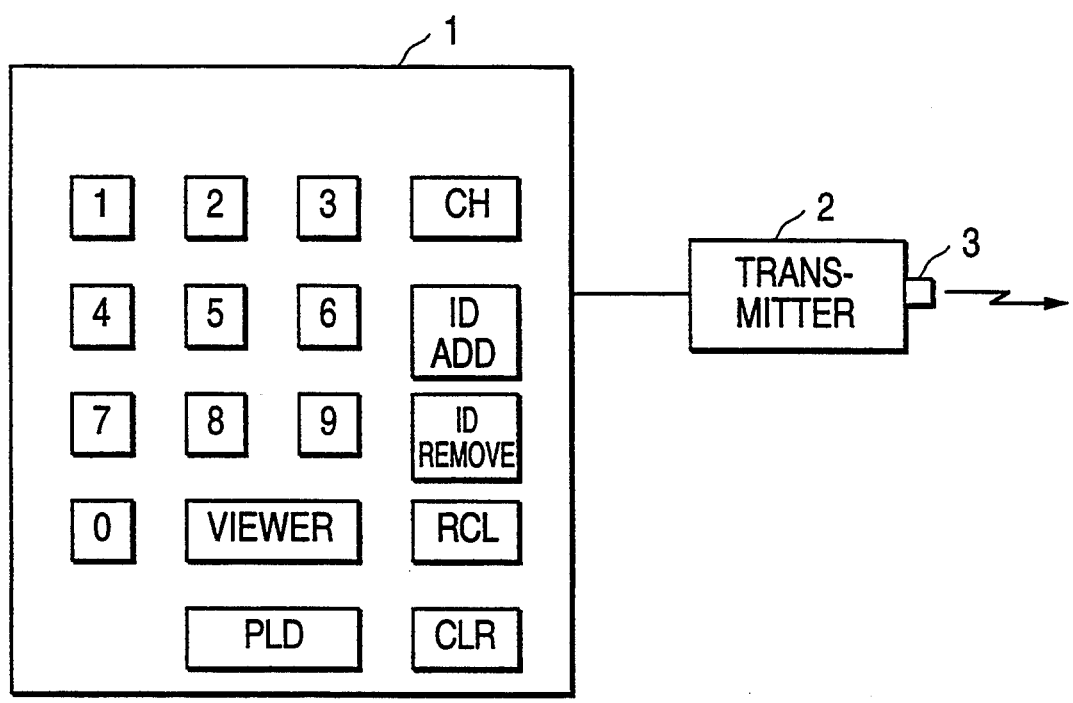
FIG. 1 illustrates a block diagram of a viewer remote control.

FIG. 1 illustrates a viewer control keypad 1 which is connected to a transmitter 2. The keypad can be comprised of a matrix of switches actuated by pushbuttons 1-0, CH, ID ADD, ID REMOVE, CLR, VIEWER and PLD (Potential List Display) which causes transmitter 2 to transmit a digital message preferably using an infrared light-emitting diode (LED) 3 in a well known manner.

While the keypad 1 contains the usual channel selection buttons 1-0 (and can have additional buttons designating channel-up, channel-down, volume-up, volume-down, and mute, for example), it also contains three additional buttons CH, designating "channel enter", ID ADD, designating "viewer identification enter", ID REMOVE, designating "view identification remove", VIEWERS, designating "active viewer list", PLD, designating "potential list display" and preferably, CLR, designating "clear screen". Depressing any of the pushbuttons causes transmitter 2 to output an unique code via LED 3, for reception by a receiver which is associated with a television set.

Figure 2:
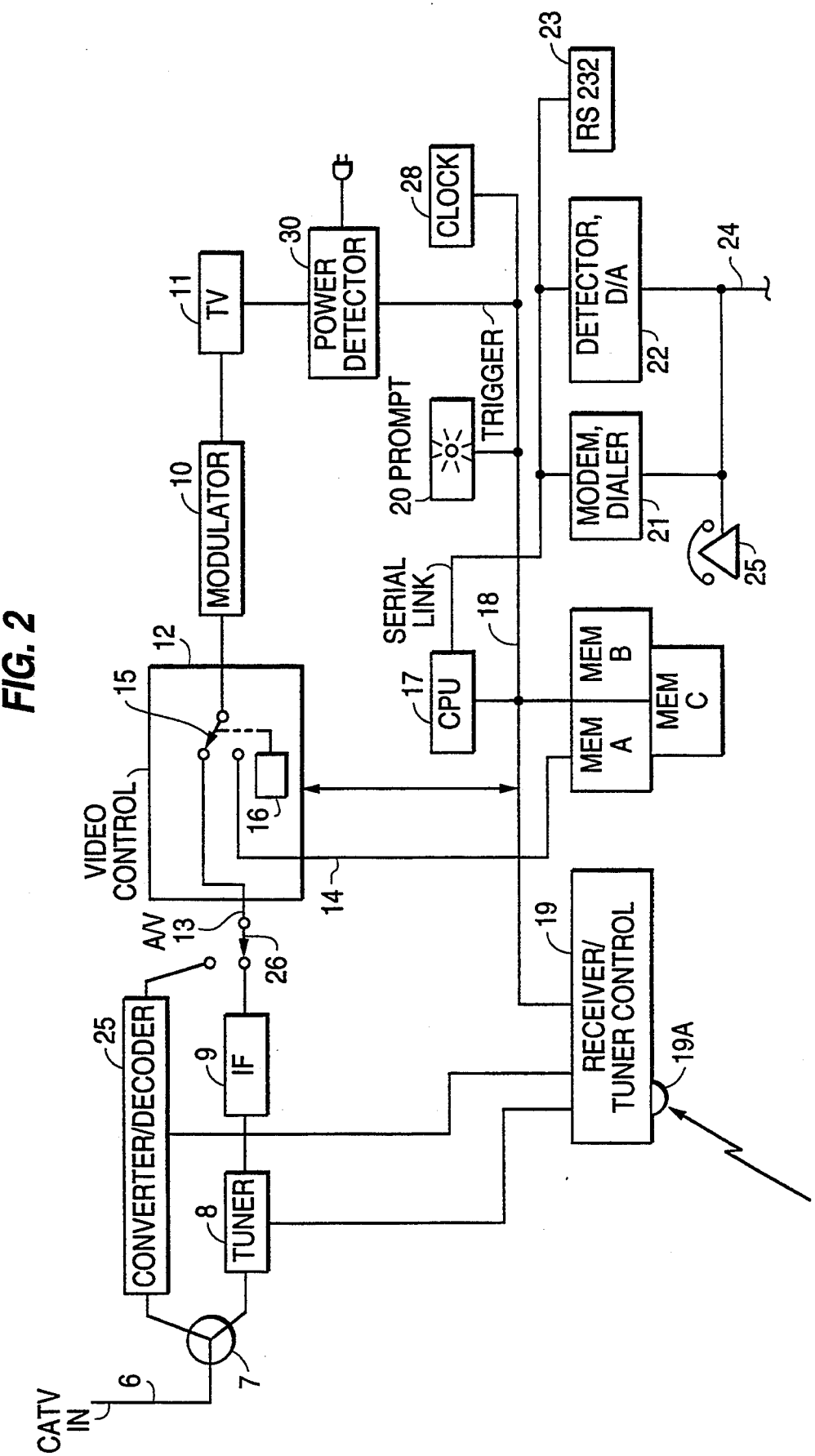
FIG. 2 is a block diagram of a system incorporating the invention.

FIG. 2 illustrates a block diagram of a system including the receiver, comprising a CATV cable 6 for carrying television programs, the cable being split in a splitter 7, one output of which is connected to the input of a tuner 8. The output of tuner 8 is connected to an intermediate frequency (IF) amplifier/demodulator 9, the output of which would in a normal remote control receiver be connected to a modulator 10, the output of which is connected to the cable input of a television set 11. Normally the modulator 10 receives the baseband frequency signal output from IF amplifier/demodulator 9, converts it to e.g. channel 3, and applies it to television set 11. This sequence is well known.

However in the present embodiment, a circuit is interposed between the output of IF amplifier/demodulator 9 and the input of modulator 10. This circuit is comprised of video control 12, which has an audio/video input 13. Within video control 12 is a switch 15, having one input which is connected to the audio/video input 13, and another input 14 which is connected to the output of a memory A to be described later. Switch 15 is controlled by switch controller 16 and is preferred to be a fast electronic switch. Under control of switch controller 16, switch 15 can switch several video lines or as little as a portion of one video line from input 14 in place of lines or part of a video line form input 13, creating an overlay.

Controlling the video control 12 is a central processing unit (CPU) 17. A data and address bus 18 is also connected to CPU 17. The switch controller 16 is controlled by CPU 17 via data bus 18.

A remote control signal receiver and tuner control 19 is connected to bus 18 and is also connected to tuner 8. Three memories, designated MEM A, MEM B and MEM C are also connected to bus 18. An off-screen prompt indicator and its control 20, referred to below as prompt, are connected to bus 18. A modem and dialer 21, telephone line detector and digital to analog converter 22, and RS232 port 23 are connected via a serial link to microprocessor 17. A telephone line 24 is connected to modem 21 and detector 22 and to a local domestic telephone 25.

In a typical installation the unit includes a converter/decoder 25 for decoding pay TV signals, the output of which is connected to the audio/video input 13 of video control 12 via a switch 26, which is controlled from either receiver/tuner control 19, or by CPU 17 via bus 18 (not shown). A video cassette recorder, video disk player, or other auxiliary apparatus may also be connected to another input of switch 26, but are not shown. It should be noted that the television set can be similarly connected to receive signals from any of a TV antenna, a satellite dish, an optical fiber, a coaxial cable, a video cassette player, an optical disc player, etc. Switch 26 is caused to receive the output signal of IF amplifier/demodulator 9 for receipt of normal programming, and can be switched to receive decoded scrambled signals when switched to the output of converter/decoder 25. The switching can be effected under manual or remote control, or if desired, under control of CPU 17 which may store in one of memories A, B or C, a channel selection schedule, and thus control the channel to which tuner 8 is tuned, or converter/decoder 25 and the switch 26, in order to control what programs are viewed at particular times.

While memories A, B and C may be separate memories, one or more may be contained in a single or in plural associated memory chips divided into separate storage regions. Memory C can be a read only memory (ROM) or a random access memory (RAM), the ROM and RAM containing programs used to operate CPU 17, in a manner described in U.S. Pat. No. 4,623,920. A battery backed-up real time clock 28 is connected to the system via bus 18.

Memory A contains signals, having meaning as will be described later, which are expected responses from the keypad 1, keyed in by a viewer, to a viewer ID enquiry prompt. The content of memory A can be predesignated, and at least part thereof changeable.

Memory B stores the channel being viewed and the identification of the particular viewers watching the television set, as designated by the viewer.

Figure 3:
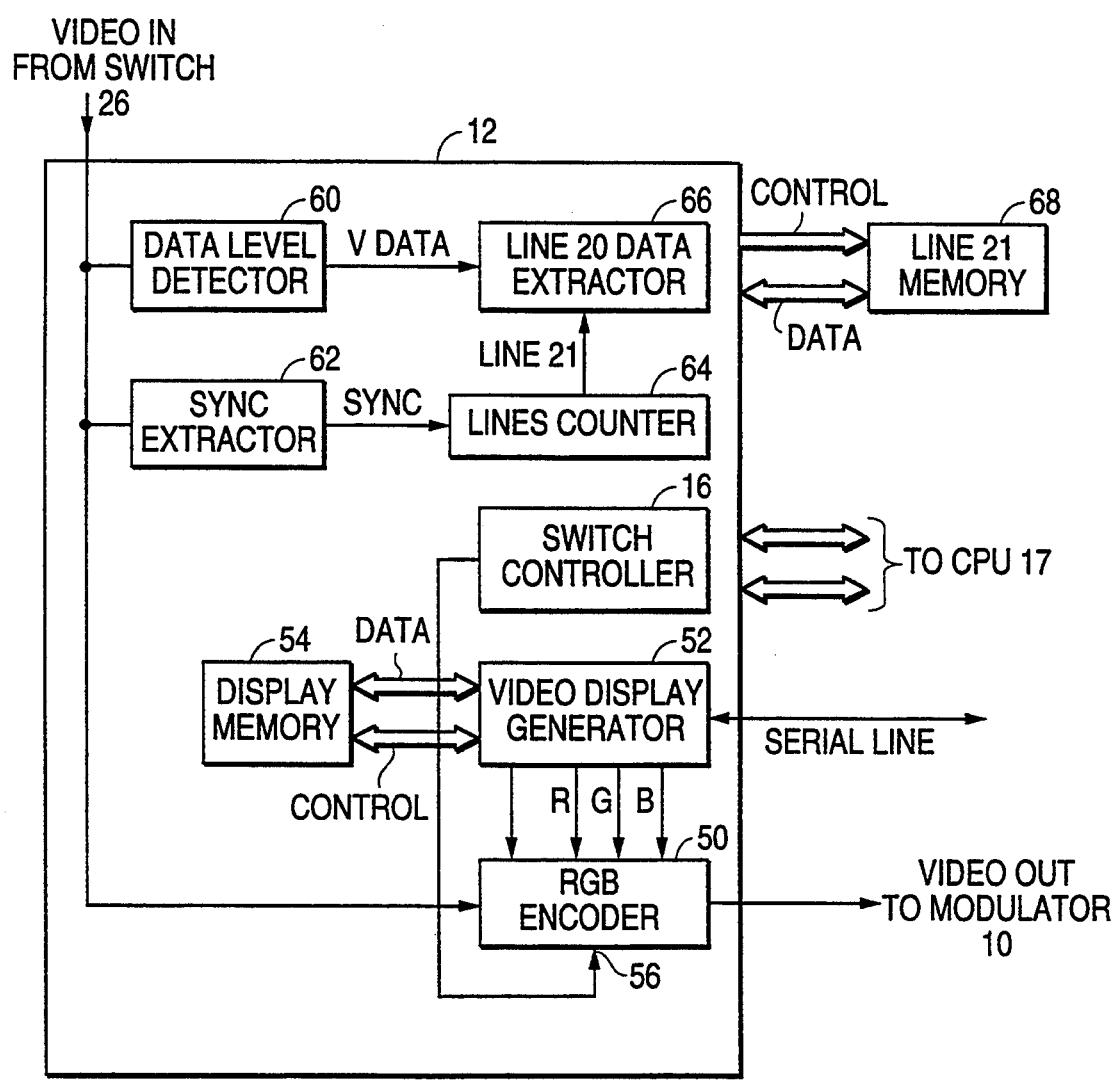
FIG. 3 is a block diagram of the video control of FIG. 2.

FIG. 3 is a block diagram illustrating the overlay system that can be used in an implementation of video control 12. The input video signal from switch 26 is applied to an RGB encoder 50. The RGB encoder also has an output for carrying a video signal to modulator 10.

A video display generator 52 which includes a memory controller has its RGB outputs as well as an overlay control lead connected to RGB encoder 50. Data and control buses are connected from video display generator 52 to CPU 17. It should be noted that a separate CPU, with RAM and ROM memories could be used to control the video overlay circuit. Data and control buses are also connected from the video display generator 52 to display memory 54.

The RGB encoder 50 contains a switch input 56 for receiving a switching signal from CPU 17 via switch controller 16.

In operation, the program video input signal is carried from switch 26 into encoder 50. In one state of the signal applied to input 56 of encoder 50 the programmed video input signal passes through encoder 50 to the video output lead, for inputting to modulator 10.

In another state of the signal applied to input 56 from CPU 17, the encoder switches the RGB signal from video display generator 52 in place of the programmed signal, at the appropriate instants. A signal from the video display generator over the overlay control lead synchronizes the encoder 50 with the signal from the video display generator.

The video display generator generates an RGB signal from a data signal stored in display memory 54. The signals stored in display memory 54 are placed there by CPU 17, and includes designations of channel numbers for overlay display to confirm channel selections, time of day (which can be displayed with the channel number) and the ID or demographic information to be displayed which the CPU 17 retrieves from the memories A and B. Once the data to be displayed is stored in display memory 54, the video display generator 52 using the memory controller can access it repetitively and can insert it into the video signal stream applied to the video output of encoder 50.

The video input signal from switch 26 is also applied to a data level detector 60 and to a sync extractor 62. The sync extractor 62 extracts the line synchronization signals from the baseband video and applies them to a lines counter 64. The lines counter 64 is reset and begins a new count following each vertical interval, providing a line 21 count to a data extractor 66.

The output signal of data level detector 60 applies its output signal to the input of data extractor 66, which, when enabled with a line 21 present indicator signal from the lines counter 64, passes the vertical interval data in video line 21 to a line 21 memory 68 via control and data buses.

With the lines counter recognizing the beginning of a frame and the beginning of each line, and passing this data to CPU 17 via the data and control bus, the CPU can thereby enable switch controller 16 to output a change of state signal via lead 72 to input 56 of encoder 50.

In this manner the CPU can obtain the timing information in order to control the location of overlay data on the television screen from display memory 54. The CPU can also obtain control or display data from a head end which is transmitted in line 21 of the vertical interval and stored in memory 68.

Operation, in accordance with one embodiment of the structure described above is as follows. Reference is also made to the sequence shown in FIG. 4A. When the television set is turned on, it automatically triggers the CPU 17 via bus 18 from a power detector 30 or by the receiver 19 receiving a "TV on" command from a local switch or from the remote control, via photoreceptor 19A. The CPU 17 previously initialized under control of a program stored in memory C, causes video control 12 to pass signals from input 13 through to modulator 10 via A/V input 13. It also controls the switch 26 to apply baseband input signals from IF amplifier/demodulator 9 to input 13. The receiver 19, having stored the last selected channel, causes tuner 8 to tune to that channel, in a well known manner. The output of tuner 8 is applied to IF amplifier/demodulator 9, the output signal of which is passed through switch 26, input 13, video control 12 and is modulated to e.g. channel 3 by modulator 10, and the output signal thereof is applied to the input of television set 11 and is displayed thereby.

Figure 4A:
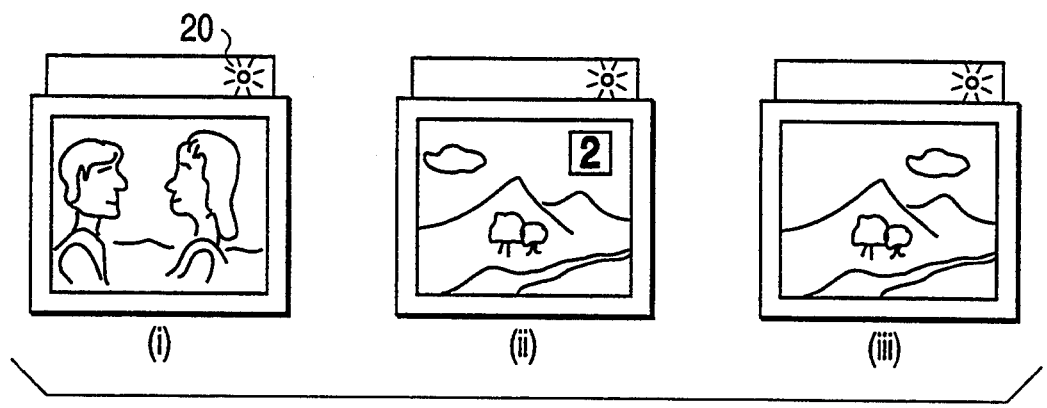
FIGS. 4A, 4B and 4C are illustrations of television set screens and prompt lights illustrating certain display sequences used in the present invention.

With a request for the television set 11 to be turned on via the remote control being received by the CPU 17, or by the sensing of the TV set power being applied as described above, or by other means, CPU 17 causes the off-screen prompt to flash (see illustration (i) in FIG. 4A) by sending a signal via bus 18 to prompt 20. The prompt 20 is not on screen where it would overlay or take the place of what is being viewed.

The viewer now has an option. It can key in its viewer ID, or can change channels. The flashing prompt is a request for the viewer to identify itself. The viewer then keys in one or plural numeric characters. The characters are transmitted to the receiver 19 in a well known manner. The characters are stored in memory B.

Assuming that the viewer intended that the numeric character should indicate the desire to change to a new channel, he then pushes the CH button. This is the equivalent of an enter key for channel change commands. The receiver/tuner control 19, upon receiving the CH signal, retrieves the signals characterizing the numeric characters that were keyed, and applies a signal to tuner 8 (e.g. a new DC level for a varactor diode contained in tuner 8) in order to change the selected channel. The prompt continues flashing. See illustrations (ii) and (iii) in FIG. 4A. Under control of CPU 17 the video control 12 is caused to display the new channel number as an overlay on the screen, in confirmation of its selection. The channel number display times out. Alternatively, the keyed numeric characters could have been stored within the remote key pad 1, and become transmitted with the following CH character, once the CH key was pushed. In that case the entire sequence is transmitted together to receiver 19, which controls the tuner 8, and the change in channel along with the time obtained from the clock 28 is stored as an entry in memory B.

Figure 4B:
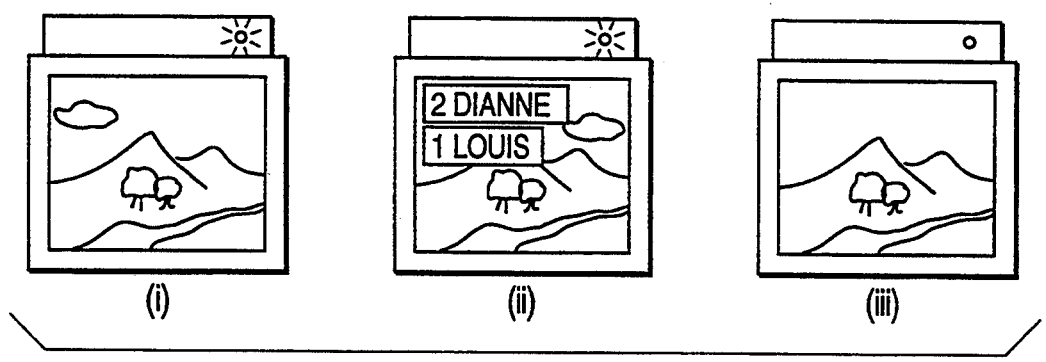

Upon the CPU having been triggered as described above, or at intervals, it signals the prompt 20 to begin flashing. The viewer, noticing the prompt 20 (see illustration (i) in FIG. 4B), now wishes to enter his viewer ID. Before describing this sequence, it should be noted that each member of the family or each expected frequent viewer is given a viewer ID numeric indicator. For example, the father might be given number 1, the mother number 2, a daughter number 3, a son number 4, etc. When the unit is installed, these numbers are pre-designated. A small computer is temporarily connected to RS 232 port 23, and the numbers, with the names and demographics of the corresponding persons are entered into the computer, and are downloaded through RS 232 port 23 for storage in memory A. This data is preferred to be uploaded to the head end once all the data has been entered, and can be changed by downloading from a head end by telephone or by cable at any time, using the system described in Canadian Patent 1,177,588 issued Nov. 6th, 1984 to Le Groupe Videotron Ltee. Rather than using a computer, the demographic data could alternatively be entered for storage via the remove control by the user himself. This is done to designate the demographics of a visitor, as will be described later.

By way of example, let us assume that both the mother and the father are watching the television set, and wish to respond to the identification (ID) prompt. In response, the mother keys numeric button 2 followed by the ID ADD key. If the embodiment is used in which a memory in the remote control stores the keyed data until the ID button is pushed, a sequence of signals comprised of 2 and ID is transmitted and is received by the receiver 19. If there is no memory in the viewer remote control, when the pushbutton 2 is keyed, a signal is transmitted to receiver 19, which either stores it as described earlier, or the signal is passed via bus 18 to be stored in memory B. When the ID button is pushed it is transmitted, and designates that the number 2 stored in memory B is an ID indicator. The receiver, if it has stored the number 2, erases the number, and does not change channels.

Once the ID signal has been received, stored in memory B and noted by CPU 17, it retrieves from memory A the data signal corresponding to the identification of the person associated with the number 2. It then applies this signal to video control 12 which overlays the identification over the program displayed on the television screen. This can be done by insertion somewhere within the screen whereby it is surrounded by program, or it may seize a group or groups of complete scanning lines, or it may substitute the identification display for the entire program that is displayed. A manner of overlaying or substituting signals into a program into a screen is described in the aforenoted Canadian Patent 1,241,736, and is commonly used in modern television sets for display of selected channel numbers, VCR programming, television set settings, etc. Control of the overlay (video insertion) is effected by operating switch 15 by means of switch control 16 which is controlled by CPU. Switch 15 thus substitutes the identification signal in place of the program signal from the amplifier/demodulator 9.

The confirmation ID signal is retrieved from memory A and is displayed; thus for this example, it will be "2 DIANNE". This is displayed for e.g. three seconds, and then is automatically removed from the screen under control of CPU 17. In the meantime, however, the ID identifier signal has been retained as an entry in memory B.

Now the second person, e.g. the father, keys in his identification into the remote control, i.e. the numeral 1, followed by the ID enter key. In a manner similar to that described with respect to identification of the mother, the ID identifier signal is stored as an entry in memory B. In a similar manner to that described above, his identification is retrieved from memory A and is confirmed by displaying in an overlay over the normal programming by video control 12. The display can now read "1 LOUIS". Alternatively, the display can list all those who have already been entered as viewers, e.g. "2 DIANNE", "1 LOUIS", each on a separate line, as shown in illustration (ii) of FIG. 4B. The display then times out and the overlay is caused to disappear as shown in illustration (iii) in FIG. 4B. The prompt stops flashing, since an active viewer ID has been designated. It could be caused to flash for another few seconds, if desired.

In case an erroneous person has been entered, or if one of the viewers leaves the room, the erroneously entered number or the number of the viewer who is about to leave the room is entered, and the ID Remove key is pushed. A corresponding signal is stored as an entry in memory B, and under control of CPU 17 the video control displays an overlay indicating the particular entry to be removed, or the list of remaining viewers. The display then times out after e.g. three seconds.

If the viewer wishes to clear the screen overlay prior to time out, he pushes the CLR button, which sends a corresponding signal which is received by CPU 17, causing control 12 to remove the screen overlay.

It should be noted that the receiver 19, by controlling tuner 8, maintains a memory of what channel the tuner is tuned to, or whether converter/decoder 25 has been selected and what channel it is tuned to. This data along with the current time from clock 28 is stored under control of CPU 17 along with the ID data, in memory B, for each data entry stored in that memory.

Returning now to the circumstance involving prompt 20, as indicated earlier, once the unit is powered up, the prompt 20 is caused to begin to flash. There are several ways of controlling the period of the flashing interval. It can be timed to flash for a defined period, e.g. 10 seconds and then automatically stop provided a viewer ID has been entered. In this case if a viewer ID has not been entered, it can continue to flash until, for example, the television set and the unit has been powered off. Indeed, the CPU can be programmed to automatically shut off the power to the TV if no viewer ID has been keyed in for a predetermined period of time after the beginning of a prompt, such as five minutes. However this may be undesirable for those cases in which a viewer wishes to keep the television set on while the house is unoccupied, or while the residents are in another part of the house.

Another way that prompt 20 can be controlled is to cause it to stop flashing as soon as the ID Enter or ID Remove or the RCL button has been keyed.

While the above, or other flashing control techniques could be used depending on the desires of the data collection company, it is preferred that it should flash for a certain period of time, such as ten seconds, if an ID indication has been keyed. If no ID indication has been keyed, it should continue flashing.

It should also be noted that other types of off-screen prompts can be enabled, such as an audio prompt, e.g. a "beep" or a voiced message in place of or in addition to the flashing light prompt. An oscillator and speaker, the amplifier being enabled by the CPU and connected to the bus 18, can generate the "beep" signal.

Once the viewer IDs have been entered and the entries stored in memory B, the viewer watches the television set in the normal manner. At predetermined intervals after the power has been applied, e.g. every thirty minutes, the CPU 17 causes prompt 20 to flash. Assuming that there have been no changes in the viewers, one of the viewers can push the recall RCL button, which is an instruction that there are no changes to the viewers. A corresponding signal is transmitted by transmitter 3 via LED 3, received by receiver 19, and is stored as an entry in memory B. This signal causes retrieval from memory A of the current list of viewers. CPU 17 causes video control 12 to display the list as a confirmation, e.g. "2 DIANNE, 1 LOUIS", as an overlay on the normal programming on the television screen, by interjecting the signal at appropriate timing into the video signal at baseband by means of switch 15, the entire signal being modulated by modulator 10 to e.g. channel 3, which is displayed on television set 11.

The overlay display times out after e.g. three seconds, or is removed by the viewer pushing the CLR button.

If a viewer has left the room, and the list shown on the screen after pushing the RCL button indicates an erroneous active viewer list, a remaining viewer keys the number of the viewer who has left (the designated number of that viewer having been shown on the screen, or being able to be recalled by pushing the RCL button again), and the ID Remove button. The deletion is stored in memory B with the time and channel as described above; the list of active current viewers is modified in memory B, and is displayed as an overlay over normal programming in the same manner as described earlier.

It may thus be seen that there are two lists of viewers stored in the memories. The first list, stored in memory A, contains all of the demographic information of the household, each person being fully demographically identified and designated by a numeral and a name. This is referred to as a potential viewer list. When the viewer ID request is prompted, and a viewer confirms his presence by keying in a numeral designating a viewer, whereupon the number and name of the selected viewer is copied from the potential list in memory A and is entered into an active viewer list which is stored in memory B. The active viewer list thus changes from being empty to all of those who are viewing, once viewers have entered the room and their identities have been indicated.

As will be described later, a visitor can be demographically defined and stored temporarily in the potential view list, then brought into the active viewer list. However this special variation, the temporary complete demographic identification of a visitor, is stored in memory B and is transmitted to the head end with the other active viewer, channel watched and time information as described herein. Following departure of the visitor from the household, or at any other time, this demographic designation from which the visitor can be identified into the active list can be erased.

When the viewing session is over, the television set is shut off but the data collection system remains on. In case of power failure, a local battery maintains the data stored in memories A, B and C and clock 28. The television set shut off time is automatically entered under control of CPU 17 retrieving the shut off time from the clock 28 after a remote control commanded "off" trigger or detection of power off by power detector 30, and is recorded in memory B. In this manner the entire sequence of remote control, and the identification of the viewers become stored in memory B as separate entries, along with the turn on and turn off times, the identification of the viewers at turn on, and the identification of viewers during recall confirmation in response to the I.D. prompt.

Indeed, operation of the present system can be modified under program control, including varying the indicia displayed on the television screen in response to the signal from the remote control, and including varying the timing of the off-screen prompt, by using the system described in U.S. Pat. No. 4,982,440 in this system.

The data stored in memory B can be obtained by a central station in any of several ways. For example, the head end can poll by sending signals in a vertical interval of the TV program signal (e.g. line 21), on a separate data channel, or on a CATV channel, which is received and decoded by a cable modem (not shown) or in video control 12, and is passed to CPU 17, which in response transmits the stored data in memory B upstream via a serial link to RS232 port 23 to the CATV head end. Patents that describe two way cable systems for transmitting upstream in this manner are U.S. Pat. Nos. 4,982,440 issued Jan. 1st, 1991 entitled "Cable Network With Filters", invented by M. Dufresne et al, and Canadian Patent 1,158,738 issued Dec. 13th, 1983, assigned to Manitoba Telephone System.

Alternatively the data stored in memory B can be transmitted to a head end via a telephone line. At a predesignated time CPU 17 polls detector 22 connected to its serial link to determine whether telephone line 24 is in use or not. If not, it causes modem 21 to dial a predetermined telephone number, execute a hand-shaking routine with a remote computer at that telephone number and then retrieves the data from memory B and causes modem 21 to transmit the data to the remote computer. After confirmation of retrieval, the modem hangs up, freeing telephone line 24, and executing a routine which clears memory B. This routine can be executed once in each twenty-four hours, for example, at a time in which the telephone line 24 is unlikely to be used, such as around 4:15 a.m. The many units in a city can be caused to perform this routine over a period of time, designated randomly or at predetermined times.

In case a subscriber lifts the telephone handset, detector 22 detects this off-hook condition and hangs up the modem immediately. Because of this interruption, he system tries later to resend the data.

It may be seen that the system allows complete control by the viewer, yet he is prompted in an unobtrusive way, with no channel lock or interference with his ability to change channels, in contrast to the system described in Canadian Patent 1,241,736 or other patents in which prompts cause overlays to appear on the screen, forced by the system. Yet more sophisticated data can be obtained than by use of a mere flashing light prompt as in the prior art, by use of the television overlay as an ID confirmation in the present invention.

The present invention can accommodate changes in viewers, or present predesignated lists of viewers stored in memory A by receiving downloaded signals from the head end of the CATV system as described earlier, rather than necessarily being programmed into the local unit by a local computer. The manner of downloading signals to be stored in memory A can be similar to that described in U.S. Pat. No. 4,639,920 issued Nov. 18th, 1986 entitled "Cable Network Data Transmission System", invented by M. Dufresne et al.

In addition to the predesignated list of persons stored in memory A, the unknown demographic qualities of one or more visitors can also be registered. Stored in memory A is a list of predesignations. For example, the ID numeral 7 can designate the presence of a first visitor, the numeral 8 a second visitor, etc. Alternatively the remote control can utilize a visitor designation entry button, and once selected, the system can automatically allocate the visitor number, e.g. numeral 5 for the first visitor, numeral 6 for a second visitor, etc. A tree of demographic designations can follow. For example once a visitor designation 7 has been entered, the ID numeral 1 can mean male, and 2 can mean female. Following this ID entry, the numeral 1 can designate age group five and under, the numeral 2 six to eleven, the numeral 3 twelve to fifteen, etc. Alternatively the actual age can be entered, and the system can allocate the age to an age group. Once these designations have been entered, the numerals can designate the commonly spoken household language, such as French, English, Chinese, Italian, etc.

Figure 4C:
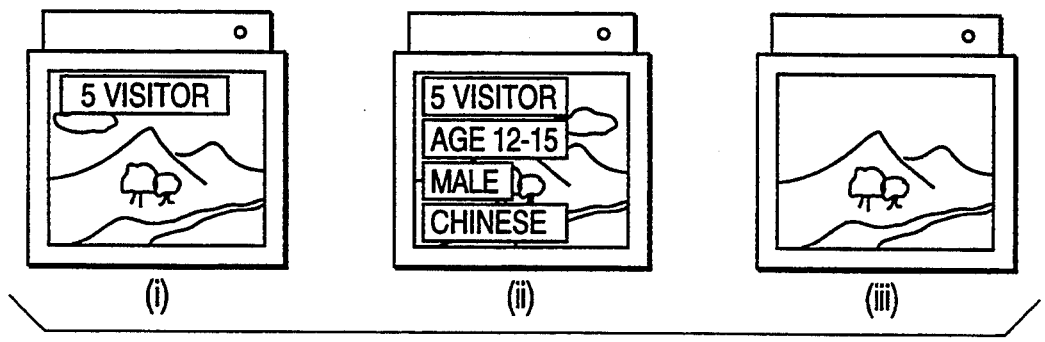
Figure 5:
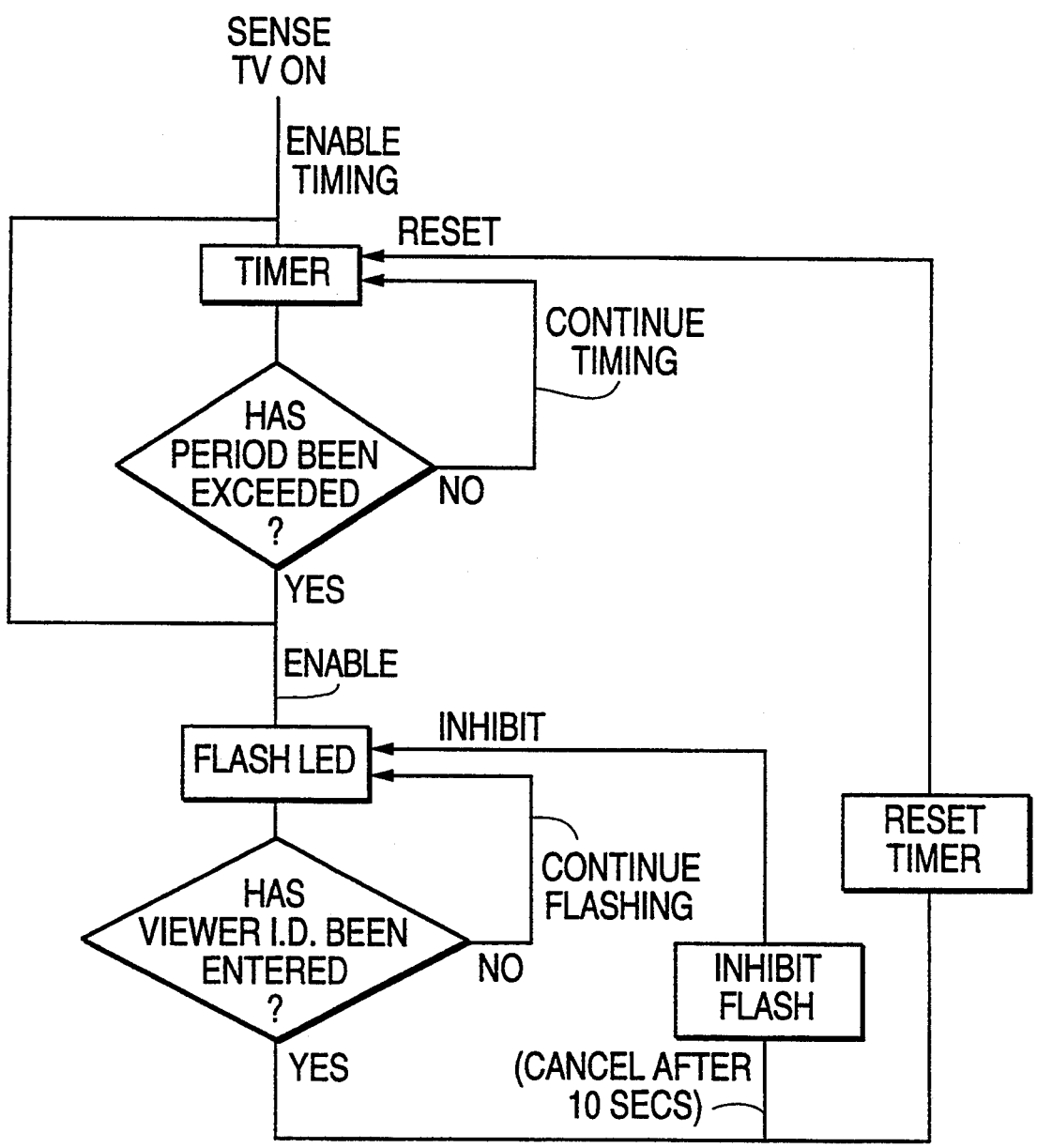
FIG. 5 is a flow chart which is used to indicate operation of the invention.

The entry of viewer identifications do not require presence of the prompt. If, for example, a visitor viewer enters the room whether or not the prompt is flashing, "7 ID Enter" is entered by a viewer on the remote control. An overlay is then generated from data stored in memory A to appear on the screen confirming the presence of a visitor, e.g. displaying the word "5 visitor" as shown in illustration (i) of FIG. 4C. The system has allocated the next unused viewer number 5 to this visitor. If additional visitors were to be identified, the system would given them sequential numbers. Then, in accordance with a predetermined sequence, the numeral, such as "3" followed by "ID Enter" is keyed, and the display adds "age 12–15". This can be changed by entering an appropriate key. The viewer keys "1 ID Enter", and the CPU retrieves from memory A a signal which is applied by video control 12 as an overlay adding to the previous overlay "male". The viewer then keys "3" "ID Enter" and as described above the display adds "Chinese" to the list on the screen. See illustration (ii) in FIG. 4C. Signals representing all these entries, being a visitor demographic definition, are stored in memory B.

It should be noted that in the case of identification of a visitor, the CPU 17 should not cause the display to time out after e.g. three seconds, since a viewer characteristic is being built up. Once the 30 characteristic has been fully confirmed and displayed, the CLR key can be pushed, clearing the screen. Alternatively the display can be left to time out and clear the screen automatically. If the RCL key is pushed, a list of all the current viewers (including "5 visitor" if added to the active viewer list) is retrieved from memory B and is displayed.

If an additional already demographically defined visitor has entered the viewing room, the procedure is repeated, this time using the allocated visitor designation e.g. "6". If one of the visitors has left, that visitor number, e.g. "5" is keyed, followed by "ID remove", removing the visitor ID from the active list.

In this manner the characteristics of all of the viewers are recorded in memory B, for gathering and later transmission to a central location.

To remove the visitors from the list of potential viewers, the keys "Viewer", "7" and "ID REMOVE" are pushed. This deletes the complete demographic definition from the potential viewer list.

A viewer can also obtain a list of all potential viewers by pushing the remote control key "POTENTIAL LIST DISPLAY" (PLD). The CPU is then caused to retrieve the entire list of potential viewers from memory A and the visitor potential list from memory B and display the list on the screen in a similar manner or described earlier.

This system has been found to provide a high degree of flexibility of use by the viewer, and provides the required demographic information for the data gatherer. The system has been found to be non-intrusive, with minimum disruption of the program viewing by the viewer, since what is displayed on the screen is under control of the viewer.

A person understanding this invention may now conceive of alternative structures and embodiments or variations of the above. All of those which fall within the scope of the claims appended hereto are considered to be part of the present invention.

The embodiments of the invention in which an exclusive property or claims are defined as follows:

1. A method of collecting data from a television audience comprising:
 (a) storing in a first memory means demographic descriptions of expected viewers of a television receiver,
 (b) receiving signals from a viewer control means operated by a viewer identifying a specific viewer prior to display of a potential viewer list,
 (c) following receipt of said signals, displaying one or more indicia on a television screen for viewing by said viewer, designated by the character of the specific viewer identifying signals received from the control means, in confirmation of specific viewer identifying signals received from the control means, and (d) storing a signal in a second memory means for later access corresponding to said designated signal character, for designation of said specific viewer as an active viewer.

2. A method as defined in claim 1 in which the indicia relate to the selection of at least one of said expected viewers by said designated signal character, and said stored signal in said second memory is a viewer indicator corresponding to one of said demographic descriptions.

3. A method as defined in claim 2 including receiving from the viewer control means another form of signals as a channel change command, immediately following the signals identifying said specific viewer and immediately changing a television channel in response thereto while avoiding storing a channel selected by said channel change command in said second memory means at the time of said channel change command.

4. A method as defined in claim 2 including enabling an off-screen viewer demographic prompt, and indicating to the television viewer by means of said off-screen prompt that an indication of what viewers are present is requested.

5. A method as defined in claim 4 including storing data indicating which television channel is being viewed in said second memory means in association with the storage of said designated signal character.

6. A method as defined in claim 4 in which said off-screen prompt is a flashing light.

7. A method as defined in claim 6 including the step of inhibiting flashing the light in association with storage of said designated signal character in said second memory means.

8. A method as defined in claim 4 in which said off-screen prompt is an illuminated display.

9. A method as defined in claim 8 including the step of inhibiting the illuminated display in association with storage of said designated signal character in said memory means.

10. A method as defined in claim 4 in which the off-screen prompt is an acoustic signal.

11. A method as defined in claim 7 in which the inhibition step is effected after a predetermined time delay following storage of said designated signal character.

12. A method as defined in claim 9 in which the inhibition step is effected after a predetermined time delay following storage of said designated signal character.

13. A method as defined in claim 2, in which said demographic descriptions are comprised of a name and one or more of sex and age range of each expected viewer, and in which the displaying step is comprised of displaying at least said name on the television screen in response to receipt of said signals from the viewer control means.

14. A method as defined in claim 2 including generating said designated signal character by depressing a predetermined identification (ID) indicating key on said control, and generating another form of designated signal character ordering a channel change by depressing a predetermined channel change key on said control.

15. A method as defined in claim 14 in which said signal corresponding to said designated signal character is stored after a predetermined interval of display of said indicia on the television screen.

16. A method as defined in claim 14 including the further step of removing the display of said indicia from the television screen following a time-out period.

17. A method as defined in claim 1 further including means for receiving and storing software programs from a broadcast or narrowcast source for controlling operation of a system performing step (a).

18. A method as defined in claim 1 further including means for receiving and storing software programs from a broadcast or narrowcast source for changing at least said indicia to be displayed.

19. A method of collecting data from a television audience comprising:

(a) storing a demographic description of each expected viewer in a potential viewer list, (b) indicating which of the potential viewers is an active viewer prior to display of said potential viewer list, (c) following said indication, displaying on the screen of a television set an indication of which of said potential viewers have already been indicated as active viewers, as confirmation of said indication, (d) storing a list of the indicated active viewers in an active viewer list, whereby the active viewer list can be retrieved to obtain a display of a list of actual active television viewers.

20. A method as defined in claim 19, including providing an off-screen prompt to stimulate an active viewer to perform the indicating step (b).

21. A method as defined in claim 19 in which the step of storing said demographic descriptions is comprised of storing a number, name, age group, gender and preferred language for each potential viewer of a television set.

22. A method as defined in claim 21 in which the step of displaying said indication of active viewers is comprised of displaying said number and name on said screen.

23. A method as defined in claim 19 further including the step of temporarily storing a demographic description of a visiting viewer as one of said potential viewers whereupon a visiting yielder can be added to the active viewer list, and erasing the temporarily stored description after the visiting viewer is no longer a visitor and thus is no longer a potential viewer.

24. A method as defined in claim 19 in which the television set is connected to at least one of a TV antenna, a satellite receiving dish, an optical fiber, a coaxial cable, a video cassette player and an optical disk player as sources for receiving video signals therefrom, and in which an indication of which source is being viewed is stored with a time of day indication with each storage of the list of active viewers.

25. A method as defined in claim 19 including indicating that the list of all the active viewers is unchanged, then confirming the latter indication by displaying the entire active list on the television screen for a limited period of time following said indication.

26. An audience measuring apparatus for use in association with a television set comprising:

(a) means for providing an off-screen prompt to a viewer from time to time, (b) first memory means and means for storing data in the first memory means designating expected responses to the prompt, (c) means for receiving signals from a remote control for selecting particular ones of said expected responses prior to displaying data corresponding to said expected responses to the prompt, (d) means for displaying data corresponding to said particular ones of the expected responses on the screen of the television set following and in response to the signals received from the remote control, (e) means for storing data signals corresponding to said particular ones of the expected responses in a second memory means, (f) means for retrieving the stored signals from the second memory means to provide an indication of said particular ones of the expected responses which were selected.

27. (Amended) An audience measuring apparatus as defined in claim 26 including means for causing a channel controller to change channels in the event of receipt of a channel change command signal from the remote control immediately following receipt of said signals for selecting particular ones of said expected responses.

28. An audience measuring apparatus as defined in claim 27 further including means for receiving and storing software programs from a broadcast or narrowcast source and for changing operation of said apparatus in response thereto.

* * * * *